(12) United States Patent
Hoss et al.

(10) Patent No.: US 10,554,628 B2
(45) Date of Patent: Feb. 4, 2020

(54) METHOD AND SYSTEM FOR SECURE COMMUNICATION OF A TOKEN AND AGGREGATION OF THE SAME

(71) Applicant: Accenture Global Solutions Limited, Dublin (IE)

(72) Inventors: Alexis Antoine Hoss, Valbonne (FR); Anh-Dung Le, Antibes (FR); Luca Schiatti, Antibes-Juan les Pins (FR); Giuseppe Giordano, Antibes-Juan les Pins (FR); Emmanuel Jean Viale, Cagnes sur Mer (FR)

(73) Assignee: Accenture Global Solutions Limited, Dublin (IE)

( * ) Notice: Subject to any disclaimer, the term of this patent is extended or adjusted under 35 U.S.C. 154(b) by 254 days.

(21) Appl. No.: 15/651,885

(22) Filed: Jul. 17, 2017

(65) Prior Publication Data
US 2018/0077122 A1   Mar. 15, 2018

(30) Foreign Application Priority Data
Sep. 15, 2016   (EP) .................................. 16290176

(51) Int. Cl.
*H04L 29/06* (2006.01)
*G06F 16/27* (2019.01)
*G06F 21/62* (2013.01)

(52) U.S. Cl.
CPC .......... *H04L 63/0421* (2013.01); *G06F 16/27* (2019.01); *G06F 21/6254* (2013.01)

(58) Field of Classification Search
CPC ..... H04L 63/00; H04L 63/04; H04L 63/0407; H04L 63/0414; H04L 63/0421;
(Continued)

(56) References Cited

U.S. PATENT DOCUMENTS

2015/0287026 A1* 10/2015 Yang .................. G06Q 20/3678
                                                        705/69
2015/0332256 A1* 11/2015 Minor ................ G06Q 20/3678
                                                        705/69

(Continued)

OTHER PUBLICATIONS

Examination Report No. 2 for Australian Application No. 2017228530, dated Aug. 16, 2018, pp. 1-4.

(Continued)

*Primary Examiner* — Eric W Shepperd
(74) *Attorney, Agent, or Firm* — Brinks Gilson & Lione

(57) ABSTRACT

A method for anonymously communicating data that defines a token from a source system to a destination system via a block-chain distributed database includes receiving, at a token distribution system, request information from a source system. The request information specifies source identifying information and an address for receiving one or more tokens. The token distribution system determines one or more tokens for allocation to the source system and communicates the allocated tokens to the address defined in the request information via a zero-knowledge transaction. The source system moves the tokens to a different address for communicating a block-chain transaction and communicates the tokens at the different address to a destination address associated with the destination system via a block-chain transaction.

18 Claims, 8 Drawing Sheets

(58) Field of Classification Search
CPC .. G06F 21/60; G06F 21/6218; G06F 21/6227; G06F 21/6245; G06F 16/27; G06Q 2230/00
See application file for complete search history.

(56) References Cited

U.S. PATENT DOCUMENTS

| | | |
|---|---|---|
| 2016/0027229 A1 | 1/2016 | Spanos et al. |
| 2016/0028552 A1 | 1/2016 | Spanos et al. |
| 2016/0330034 A1* | 11/2016 | Back ................ G06Q 20/06 |
| 2016/0342994 A1* | 11/2016 | Davis ............... G06Q 20/027 |
| 2017/0061398 A1* | 3/2017 | Joseph ............. G06Q 20/0655 |
| 2017/0109735 A1* | 4/2017 | Sheng .............. G06Q 20/3678 |
| 2017/0109955 A1* | 4/2017 | Ernest .............. H04L 9/3257 |
| 2017/0352219 A1* | 12/2017 | Spanos ............. G07C 13/00 |
| 2018/0247076 A1* | 8/2018 | Lerner ............. H04L 67/2847 |
| 2018/0307859 A1* | 10/2018 | LaFever ........... H04L 63/0407 |
| 2019/0005756 A1* | 1/2019 | Chaum ............. G07C 13/00 |
| 2019/0019183 A1* | 1/2019 | Karame ........... G06Q 20/3829 |
| 2019/0149429 A1* | 5/2019 | Stocker ............ H04L 67/104 |

OTHER PUBLICATIONS

Australian Patent Office, Examination Report No. 1 for Australian Patent Application No. 2017228530, dated Apr. 9, 2018, pp. 1-4.
European Patent Office, Extended European Search Report from EP Application No. 16290176.3 dated Mar. 30, 2017, 9 pages.
Eli Ben-Sasson et al., "Zerocash: Decentralized Anonymous Payments from Bitcoin", International Association for Cryptologic Research, vol. 20140519: 163647, May 19, 2014, pp. 1-56, XP06106124 [retrieved on May 19, 2014].
Satoshi Nakamoto, "Bitcoin: A Peer-to-Peer Electronic Cash System", Oct. 31, 2008, XP055131503, Retrieved from the Internet: URL: https://bitcoin.org/bitcoin.pdf [retrieved on Jul. 24, 2014], 9 pages.
Examination Report No. 3 issued on Australian patent application No. 2017228530, dated Feb. 14, 2019, 4 pages.

* cited by examiner

METHOD AND SYSTEM FOR SECURE COMMUNICATION OF A TOKEN AND AGGREGATION OF THE SAME

RELATED APPLICATION

This application claims the benefit of priority to European Application No. 16 290 176.3, filed Sep. 15, 2016, the contents of which are hereby incorporated by reference in their entirety.

BACKGROUND

Field

This application generally relates to the digital communication of confidential information in a secure manner. In particular, this application describes a method and system for securely communicating a digital token from a source system to a destination system and an aggregation method and system for determining a number of tokens received by the destination.

Description of Related Art

As used herein, the term token corresponds to metadata that defines a digitally transferable item. That is, an item that can be transferred from one person to another. Like a physical item, the recipient takes ownership of the token and the sender surrenders control over the token to the recipient.

One such situation where this analogy applies is digital currency schemes, such as Bitcoin. In Bitcoin, actual currency (dollars, euros, etc.) are converted into a number of tokens referred to as bitcoins. The bitcoins are stored in a digital wallet associated with a sender. The conversion entails generating, among other information, metadata that defines a number of bitcoins that corresponds to the amount of real currency converted based on an exchange rate. This metadata may be transferred among individuals utilizing a distributed database/ledger that defines so-called block-chain records, which roughly correspond to a linked-list of records or Bitcoin transactions.

Unlike a traditional ledger, which may be centralized or commonly owned, the block chains that define the distributed ledger are replicated among various nodes/computers on a network. Block chains are utilized by each node as a way to construct consensus around the validity of transactions, and to ensure that all changes are auditable. Stated differently, the distributed ledger corresponds to a record of consensus with a cryptographic audit trail that is maintained and validated by several separate nodes. Block chains of the distributed ledger act as a way to record the order of, and validate the transactions in, the distributed ledger. The block chains provide a decentralized accounting ledger that facilitates value transfer without a trusted third party. Identities of the transacting parties are either pseudonymous or anonymous.

Once a sender has bitcoins in his wallet, he may send them to a recipient. To facilitate the transfer, the sender first creates a source address through which the bitcoins (i.e., bitcoin transaction data) will be sent. The sender then initiates a transfer of bitcoins located at the first address to a destination address. In practice, a transaction is generated by the sender. The transaction defines the number of bitcoins transferred, the sender's address, the destination address, and information related to one or more transactions from which the bitcoins being transferred originated. The transaction is added as a record to the distributed database. The bitcoins transferred via the transaction eventually appear in a digital wallet associated with the recipient, where they may be used for future transactions or converted into real currency.

BRIEF SUMMARY

In one aspect, a method for anonymously communicating data that defines a token from a source system to a destination system via a block-chain distributed database includes receiving, at a token distribution system, request information from a source system. The request information specifies source identifying information and an address for receiving one or more tokens. The token distribution system determines whether a user associated with the request is registered with the token distribution system and, if so, a number of tokens to allocate to the user. If the user is registered with the token distribution system, the token distribution system determines one or more tokens for allocation to the source system based in part on the number of tokens to allocate to the user, and communicates the allocated tokens to the address defined in the request information via a zero-knowledge transaction via the block-chain distributed database. The source system moves the tokens to an address for communicating a block-chain transaction and communicates the tokens at the different address to a destination address associated with the destination system via a block-chain transaction.

In a second aspect, a system for anonymously communicating data that defines a token via a block-chain distributed database includes a token distribution system configured to request information from a source system. The request information specifies source identifying information and an address for receiving one or more tokens. The token distribution system is also configured to determine whether a user associated with the request is registered with the token distribution system and, if so, a number of tokens to allocate to the user. If the user is registered with the token distribution system, the token distribution system is configured determine one or more tokens for allocation to the source system based in part on the number of tokens to allocate to the user, and to communicate, via the block-chain distributed database, the allocated tokens to the address defined in the request information via a zero-knowledge transaction. The system also includes a source system configured to move the tokens to a different address that corresponds to an address for communicating a block-chain transaction and communicate the tokens at the different address to a destination address associated with the destination system via a block-chain transaction.

In a third aspect, a non-transitory computer readable medium is provided that has instruction code stored thereon for anonymously communicating data that defines a token from a source system to a destination system via a block-chain distributed database. The instruction code is executable by a machine for causing the machine to perform acts including receiving request information from a source system, where the request information specifies source identifying information and an address for receiving one or more tokens. The machine also performs acts of determining whether a user associated with the request is registered with the token distribution system and, if so, a number of tokens to allocate to the user; if the user is determined to be registered with the token distribution system, determining one or more tokens for allocation to the source system based in part on the number of tokens to allocate to the user, communicating via the block-chain distributed database the allocated tokens to the address defined in the request information via a zero-knowledge transaction, moving the tokens to a different address that corresponds to an address for communicating a block-chain transaction, and communicating the tokens at the different address to a destination address associated with the destination system via a block-chain transaction.

DETAILED DESCRIPTION

The inventors have realized that another context where schemes for transferring tokens might be considered useful is in the voting context. For example, a token could be considered to be cast, where the vote indicates a selection for a person, item, service, law, etc. For example, a vote may be cast to indicate a selection of a person (e.g., a candidate in an election), an item (e.g., a consumer good), a service (e.g., a municipal or private service), a law (e.g., a desired change to a local law), etc. Voters could cast their vote for a candidate for office by transferring their vote (i.e., token) to the candidate. The vote could be transferred over an existing block-chain distributed database, such as the Bitcoin distributed database, in which case one vote might be represented as one bitcoin. Alternatively, a different block-chain distributed database could be used.

Figure 6:
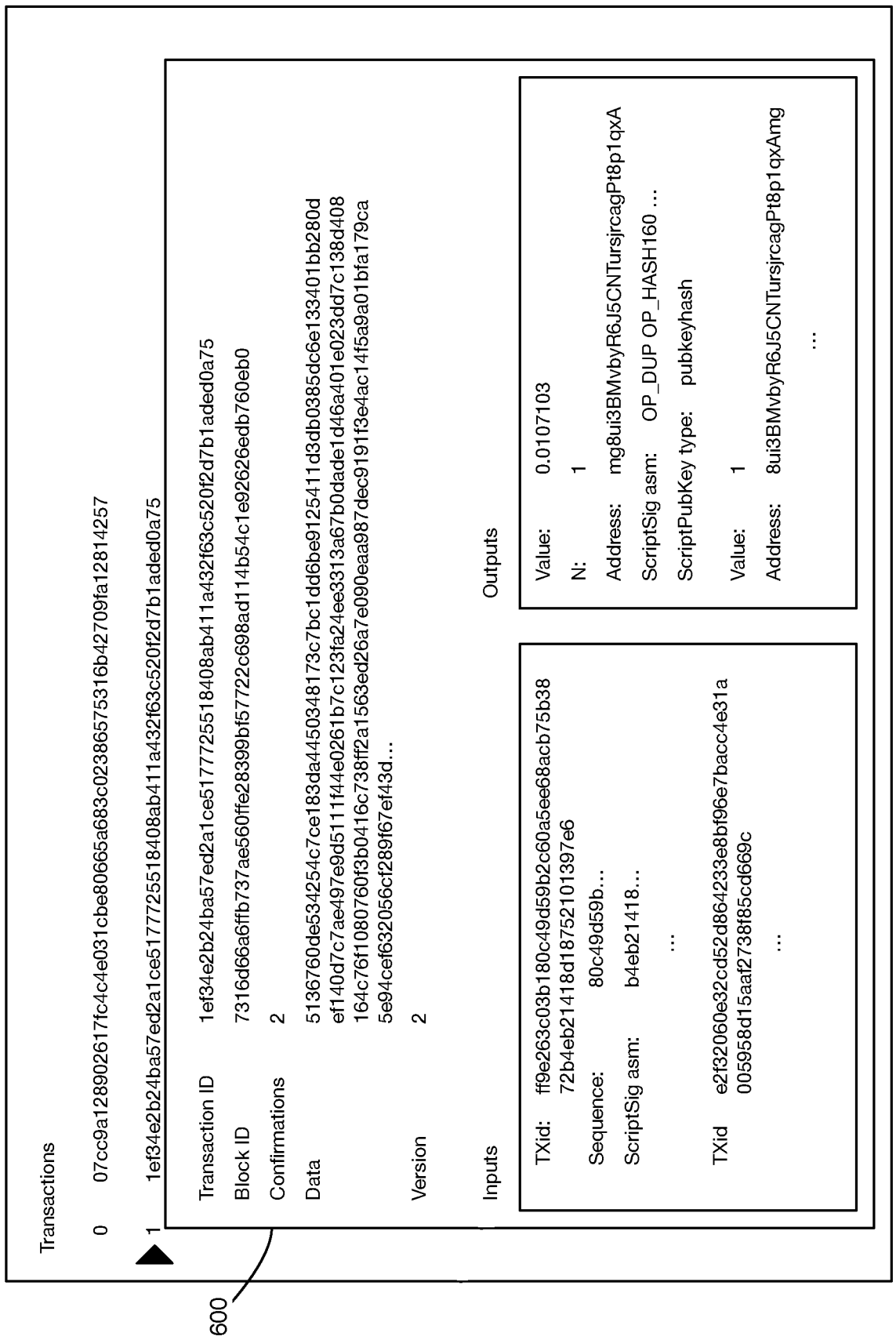
FIG. 6 illustrates a typical block-chain transaction that may be communicated over a block-chain distributed database.

Unfortunately, anonymity of transactions over traditional block chains cannot be guaranteed because, while difficult, one might be able to determine the history of transactions of a user associated with a given address by reading the content of the entire block chain and selecting the transactions in which the given address is involved. For example, FIG. 6 illustrates typical transaction information 600 that may be stored within a block. The illustrated information 600 is publicly viewable and includes addresses that represent the sender and the receiver of the associated amount of tokens. One could conceivably read through the whole block chain and obtain a list of transactions in which a specific address is either the sender or the receiver of token(s). Thus, a candidate or others could potentially determine that a voter cast his vote for a particular candidate if they are somehow able to associate an address to a physical identity.

Figure 1:
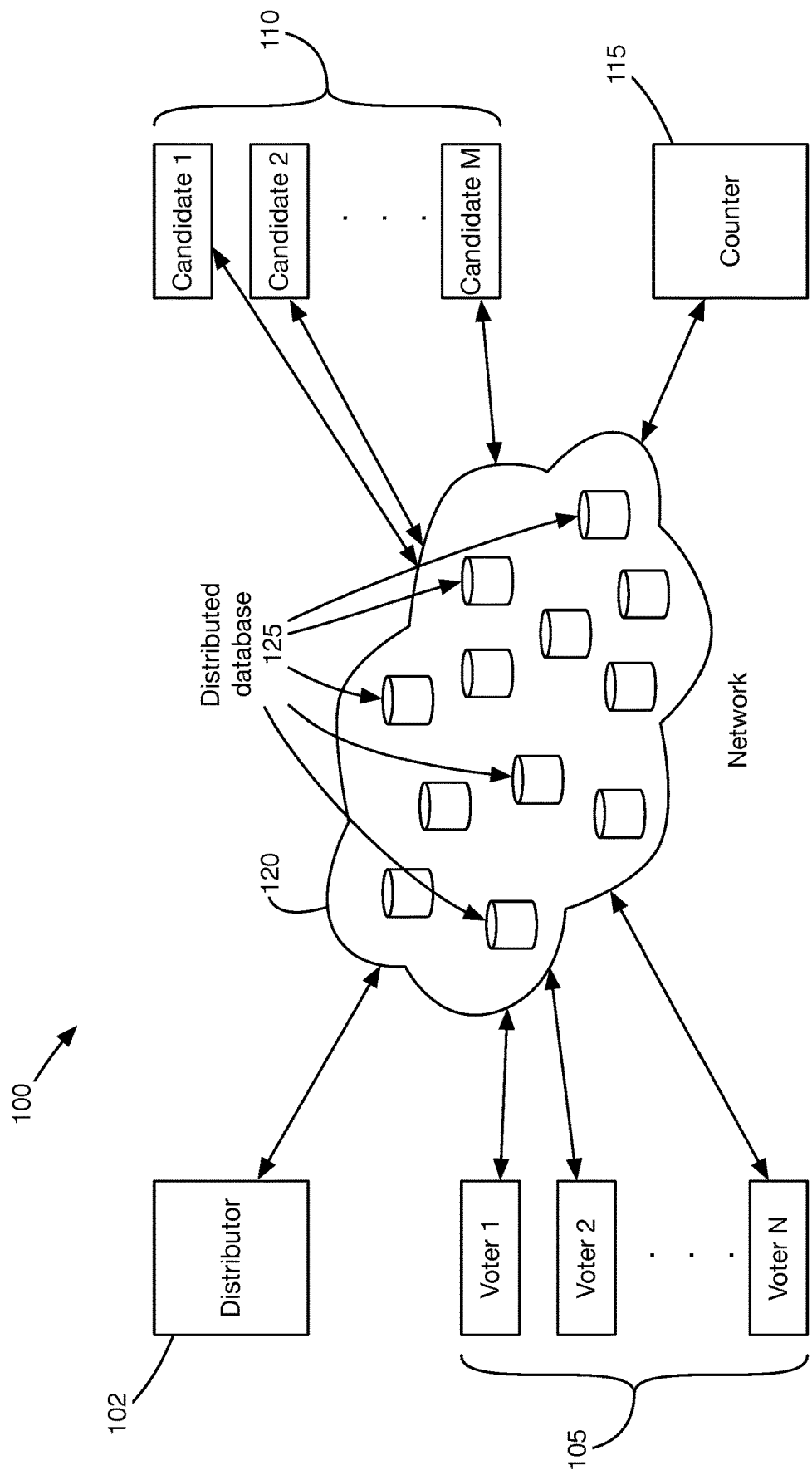
FIG. 1 illustrates an exemplary environment for securely communicating a token from a source system to a destination system, and an aggregation system for determining a number of tokens received by the destination system.

FIG. 1 illustrates an exemplary environment 100 for securely communicating a token from a source system to a destination system that overcomes the problems above. The exemplary environment 100 also includes an aggregation system for determining a number of tokens received by the destination system. The environment 100 includes a distributor system 102, a group of voter systems 105, a group of candidate systems 110, and a counter system 115.

As illustrated, the systems may communicate with one another via a network 120 such as the Internet. Residing on other systems through the network may be any number of databases that together define a block-chain distributed database 125 through which certain transactions described below may be communicated.

In the exemplary environment 100, a token communicated between the respective systems corresponds to a vote, the voter systems 105 correspond to source systems, the distributor system 102 corresponds to a token distribution system, the candidates 110 correspond to destination systems, and the counter system 115 corresponds to a token aggregation system.

Figure 2:
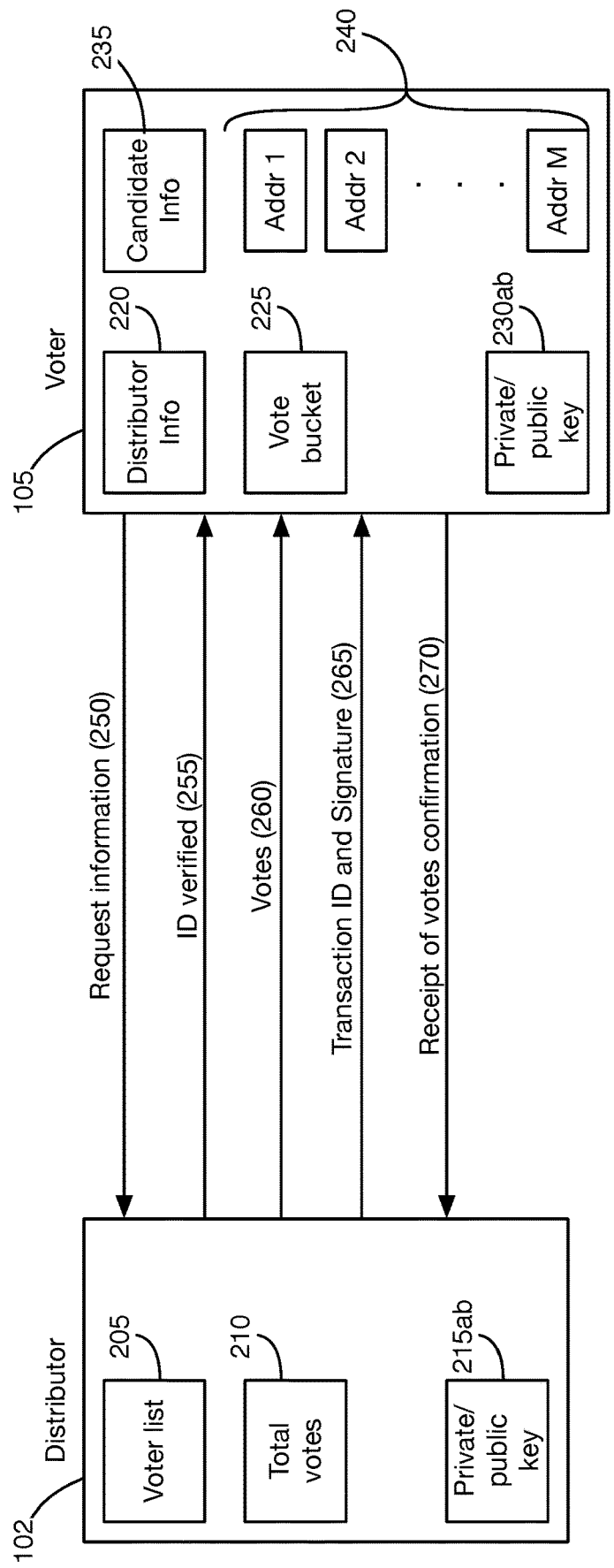
FIG. 2 illustrates the details of a distributor system and voter system of the environment and the communication flow that occurs between the two.
Figure 3:
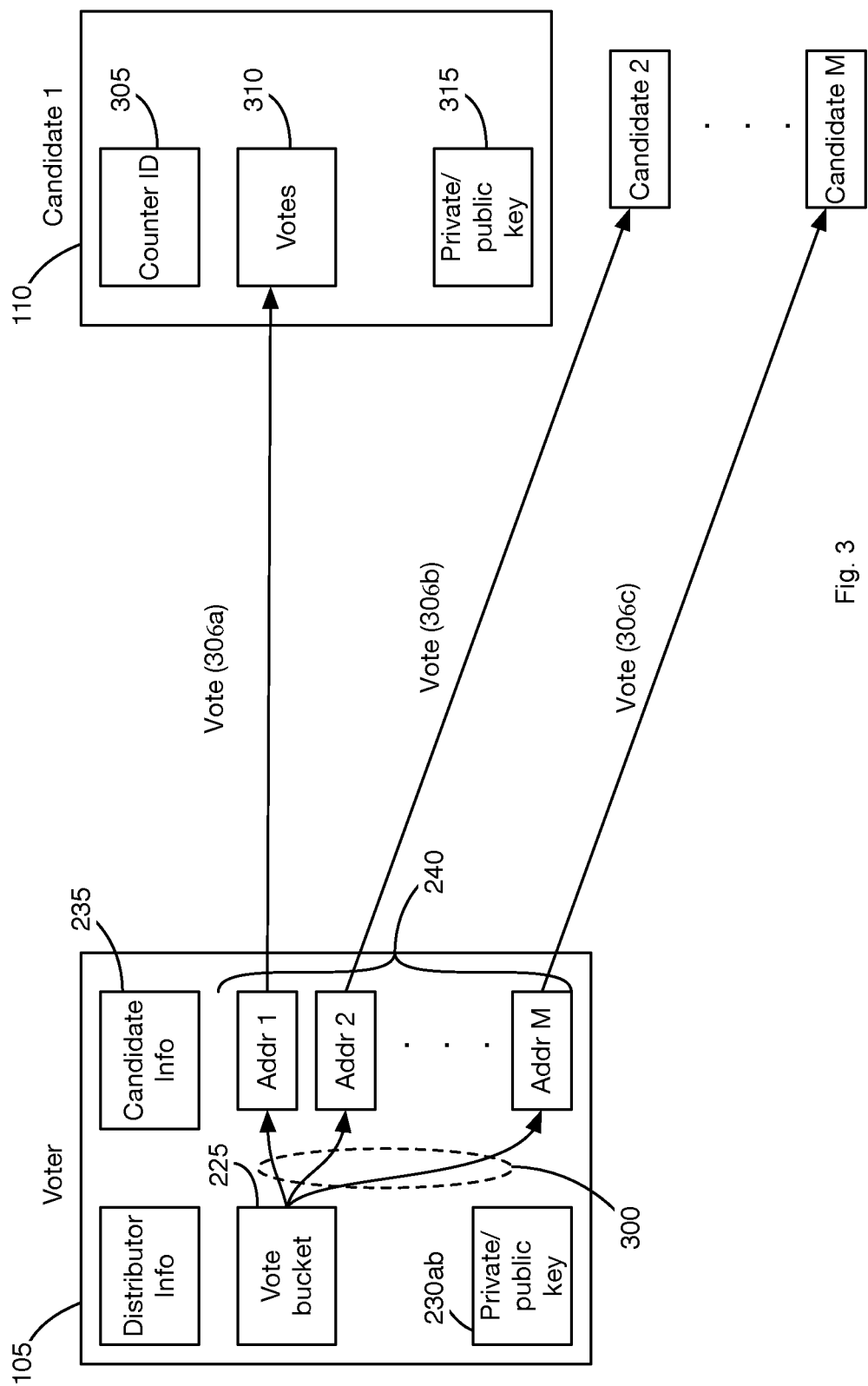
FIG. 3 illustrates details of a candidate system of the environment and the communication flow that occurs between the voter system and the candidate system.
Figure 4:
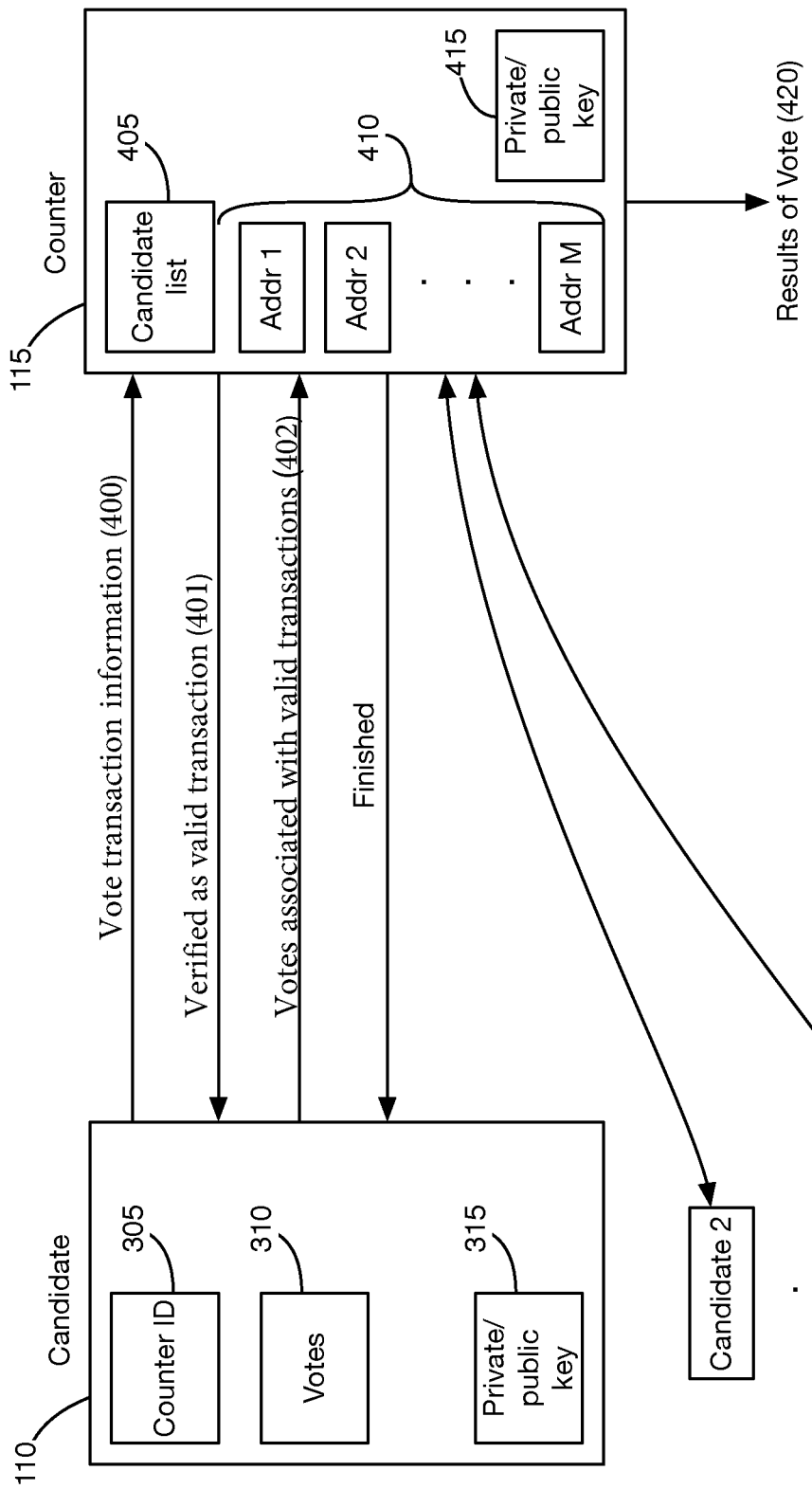
FIG. 4 illustrates details of a counting system of the environment and the communication flow that occurs between the candidate system and the counting system.

FIGS. 2-4 illustrate details of the respective systems along with the flow of information between the respective systems. Referring to FIG. 2, the distributor system 102 may store information that defines a voter list 205, the total votes 210 or tokens that may be distributed for a given election, a private key 215$a$, and a public key 215$b$ that may be utilized for the encryption of messages communicated between the distributor system 102 and one or more voter systems 105.

The voter list 205 may correspond to a database with records that relate actual voters to votes to be cast in an election. Table 1 illustrates exemplary records that may be stored in the database.

TABLE 1

| Voter Name | Election | Number of Votes | IP Address | Public Key |
|---|---|---|---|---|
| John Smith | Mayor | 1 | 70.1.50.2 | Ah8567N |
| John Smith | Treasurer | 1 | 70.1.50.2 | Ah8567N |
| Jane Jones | Mayor | 1 | 70.1.50.4 | B5F13LK |
| Jane Jones | Treasurer | 1 | 70.1.50.4 | B5F13LK |
| ... | ... | ... | | |

Referring to Table 1, the name of each voter may be related to an election such as a mayoral race or the election of a treasurer, and the number of votes that may be cast by the named voter in the election. Other information may include an address, such as an IP address of the voter system 105 to which messages and votes should be communicated, and the public key 230$b$ of the associated voter system 105 for sending secure messages.

In the illustrated example, each voter has one vote per election, but the number of votes may be different depending on the type of election. For example, to facilitate using the system to vote for members of the board of directors of a company, a given voter/shareholder may be allocated a number of votes that is proportional to a number of shares owned by the voter/shareholder.

The total number of votes 210 may correspond to the total number of votes available to be cast in a given election. The total number of votes 210 may correspond to the sum of all the votes specified in the Number of Votes column of Table 1.

The voter system 105 may store distributor system information 220 that facilitates communicating information and enhances privacy with the distributor system 102. For example, the distributor system information 220 may include an IP address of the distributor system 102 along with the public key 215b provided by the distributor system 102 for communicating secure messages to the distributor system 102.

The voter system 105 may also store candidate information 235 that facilitates communicating information to one or more candidates 110. In this case, the candidate information 235 may include addresses in the block-chain distributed database 125 associated with each candidate 110 to which votes from the voter system 105 are to be communicated.

The voter system 105 also defines a private vote bucket address 225 for receiving one or more votes from the distributor system 102 and one or more block-chain distributed database addresses 240 to which the votes in the bucket address 225 may be transferred when communicating votes to one or more candidates 240, as described below.

As noted above, both the distributor system 102 and the voter system 105 define private/public keys 215ab and 230ab for encrypting/decrypting messages communicated to one another to make those messages secure. For example, a voter system 105 may encrypt a message to the distributor system 102 using the distributor system's 102 public key 215b. The distributor system 102 may then decrypt the received message using the private key 215a. The opposite is true when the distributor system 102 communicates a message to the voter system 105. That is, the distributor system 102 may encode a message to the voter system 105 via the voter system's 105 public key 230a and the voter system 105 may decrypt the received message using the voter system 105 private key 230b.

In operation, the sequence of messages for sending votes from a distributor system 102 to a voter system 105 may begin with the communication of a request message 250 from the voter system 105 to the distributor system 102. The request 250 may include the actual voter's name, the number of votes desired by the voter, the bucket address for receiving votes, and a signature. Other information may be included.

The signature may correspond to a unique ID for identifying the user associated with the voter system 105. For example, the signature may correspond to a combination of the name of the user associated with the voter system 105, the number of votes requested by the user, and the bucket address for receiving the votes. The various items of information may be combined in various ways. For example, the items may be concatenated into one long string, or utilized to form a hash value, etc.

Upon receiving the request from the voter system 105, the distributor system 102 determines whether the user named in the request 250 is listed in the voter list 205. The distributor system 102 may also determine whether the number of votes requested matches the number of votes available for the named user. If the information matches, the distributor system 102 may communicate a message 255 to the voter system 105 to indicate that the identification of the voter is verified. Otherwise, a message indicating the reason for a mismatch or other issue may be communicated to the voter system 105.

If the information above matches, the distributor system 102 may communicate a votes transaction 260 that specifies a number of votes to the private vote bucket address 225 of the voter system 105 via the block-chain distribution system 125. That is, metadata that identifies one or more votes may be communicated to the voter system 105. In this regard, unlike the typical block-chain transaction of FIG. 6 where all the information is publicly viewable, the transaction may correspond to a zero-knowledge proof (ZKP) transaction in which only the distributor system 102 and voter system 105 are capable of inspecting the contents of the transaction.

The zero-knowledge proof transaction is based on the zero-knowledge proof method whereby one party (the prover) can prove to another party (the verifier) that a statement is true without revealing any secret information that could determine that the statement is true. This may be accomplished by manipulating data provided by the verifier in a way that would be impossible without the secret information, and doing enough repetitions that the verifier is convinced that the prover has the information he pretends to have. Zcash is an exemplary cryptocurrency used in some Bitcoin transactions that utilizes the zero-knowledge proof method. With Zcash, payments are published on a public block chain (different from the Bitcoin block chain), but all the information about them (e.g., sender, receiver, amount) are only available and visible to the concerned parties of the payments and hidden from anyone else. Zcash uses a zero-knowledge proof construction called a zero-knowledge Succinct Non-interactive Arguments of Knowledge (zk-SNARK) which allows the validators to validate a transaction without knowing what the transaction contains, only that the values balance, and that the coins associated with the Zcash, are spendable.

Figure 7:
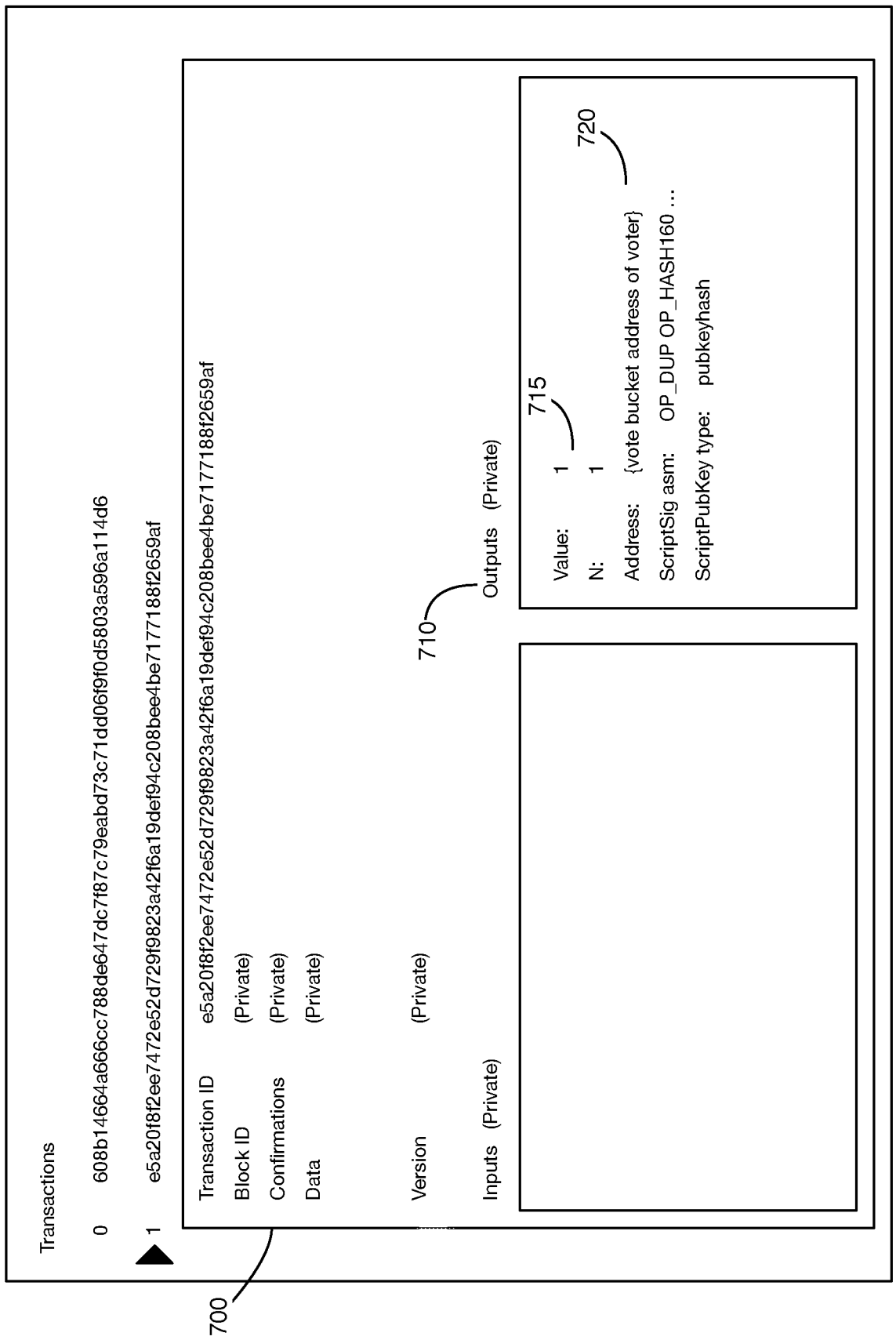
FIG. 7 illustrates an exemplary zero-knowledge proof transaction that may be communicated over the block-chain distributed database.

FIG. 7 illustrates an exemplary ZKP transaction 700 that may be based on the zero-knowledge proof method and/or the zk-SNARK variant, which may be utilized to communicate vote transactions to the voter system 105. As illustrated, the output 710 of the ZKP transaction 700 in this case specifies a value 715 of one, which may correspond to one vote. The address 720 of the output 710 of the ZKP transaction 700 corresponds to the vote bucket address 225 of the voter system 105. Items in the ZKP transaction 700 indicated as private are only viewable by the distributor system 102 and the voter system 105. Thus, the votes transaction 260 may be communicated to the voter system in a manner that prevents other users of the distributed database 125 from inspecting the contents of the votes transaction.

In some implementations, the distributor system 102 may communicate a message 265 that includes a transaction ID associated with the votes and the signature communicated in the request 250. The voter system 105 may use this information to verify that the votes received were in fact intended for the voter system 105.

After receiving the votes and optionally confirming that the votes were sent to the correct recipient, the voter system 105 may communicate a message 270 to the distributor system 102 acknowledging receipt of the votes.

FIG. 3 illustrates the flow of information between the voter system 105 and one or more candidates 110. In a first operation 300, the voter system 105 may move one or more votes stored in the vote bucket 225 to one or more addresses 240 associated with the block-chain distributed database 125. In this regard, the number of addresses 240 may correspond to the number of elections for which the user associated with the voter system 105 may cast a vote. For example, if there is a mayoral election and an election for treasurer, two block-chain addresses may be generated.

In operations 306a-c, the voter system 105 may communicate one or more votes to candidates 110 of a corresponding number of elections. For example, the voter system 105 may have moved one vote from the private vote bucket 225 to a first public address (Addr 1) to indicate that the user of the voter system 105 is casting a vote for a first candidate. The vote in the first public address may be communicated to the vote address 310 associated with candidate 1 via the block-chain distributed database 125. Similarly, votes at a second address (Addr 2) may be moved to an address associated with a second candidate and so on until the voter system 105 has transferred all the votes in the vote bucket 225.

Figure 8:
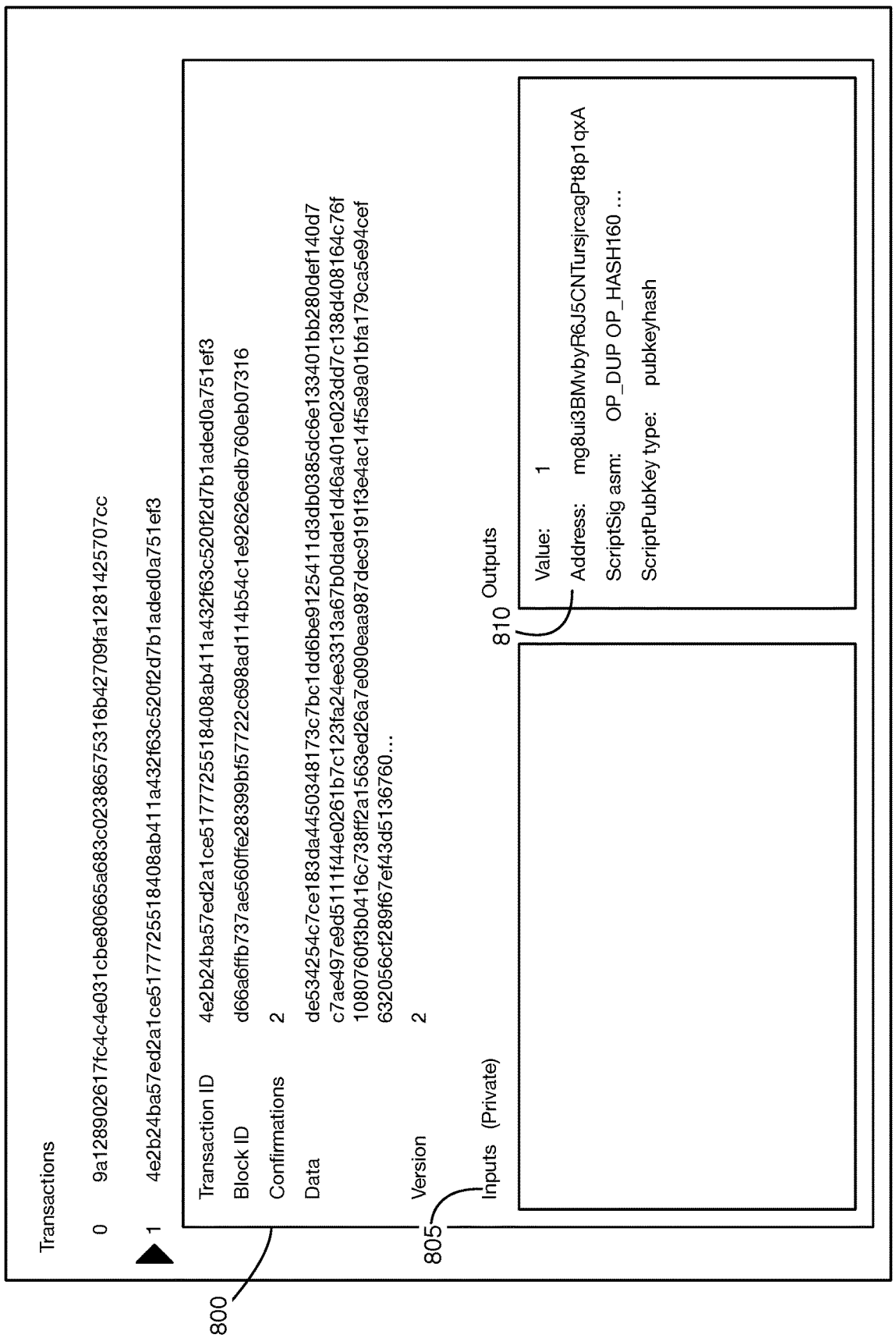
FIG. 8 illustrates an exemplary transaction that may be communicated over the block-chain distributed database when a user moves the tokens from the address defined in the request to a different address that corresponds to an address for communicating a block-chain transaction.

As noted above, in a typical block-chain distributed database transaction, it is possible for any user of the distributed database 125 to read the content of that transaction and see which addresses are involved, that is to say from and to which address the token(s) were sent. Having the voter system 105 transfer the votes from the private bucket address to the public address associated with a candidate breaks the link between the address receiving the token and the address sending this/these token(s), therefore breaking the link between a registered user and a voter. Transferring the votes from the distributor system 102 to the voter system 105 using a zero-knowledge proof transaction further enhances this aspect. This makes it virtually impossible to determine the actual user associated with the public vote for a particular candidate. For example, as illustrated in the exemplary vote transaction 800 of FIG. 8, the output address 810 of the vote transaction 800 is available for public inspection and corresponds to the address 240 of the voter 105 for sending the vote transaction 800. However, the input transaction(s) 805 (i.e., the source(s) of this transaction 800) is/are private and, therefore, unavailable for public inspection. That way, it is virtually impossible to make the link between 720, the vote bucket address 225 of the voter system 105, and 810, the address 240 of the voter 105 for sending the vote transaction 800.

FIG. 4 illustrates the flow of information between a candidate system 110 and a counter system 115. Messages communicated between the candidate and counter systems 110 and 115 may be encrypted/decrypted via respective private/public keys 315 and 415, as described above. In this regard, the candidate system 110 may store counter identification information 305 that facilitates communicating messages and votes to the counter system 115. For example, the counter identification information 305 may specify an IP address and a public key for communicating messages to the counter system 115. The counter identification information 305 may also include an address 410 of the block-chain distributed database 125 for receiving votes that were previously provided to the candidate system 110.

The counter system 115 may in turn include information that defines a candidate list 405 that identifies candidate systems 110 from which votes will be received. For each candidate, the counter system 115 may generate an address within the block-chain distributed database 125 for receiving votes from a given candidate system 110.

In transferring votes, the candidate system 110 communicates a first message 400 that defines transactions associated with each of the votes the candidate system 110 received. The transactions for each vote may include a timestamp that corresponds to a time at which the candidate system 110 received the vote. Other information may be provided.

After receiving the first message 400, the counter system 115 determines whether the votes received from the candidate system 110 are valid. For example, the counter system 115 may have been pre-programmed with the date or dates of a given election. Transactions having a timestamp before the election date or after the election date may be considered invalid. Thus, votes associated with those transactions may also be considered invalid. In addition, votes that were not directly received by from voter system 105 may also be considered in valid. This may occur, for example, when a first candidate attempts to transfer votes to a second candidate. Therefore, the mentioned checks help to prevent voter fraud.

After determining the validity of the votes based on the transactions, the counter system 115 may send a message 401 to the candidate system 110 to have the candidate system 110 send only those votes that are associated with transactions determined by the counter system 115 to be valid.

Upon receiving the second message 401, the candidate system 110 selects the valid votes 402 and communicates the votes to the address setup for the candidate by the counter system 115 via the block-chain distributed database 125.

The process described above repeats until all the votes have been received from the various candidate systems 110. After receiving the votes, the counter system 115 may generate a report 420 that indicates the number of votes received by each candidate, such as the report of table 2 below.

TABLE 2

| Candidate | Number Of Votes |
|---|---|
| Candidate 1 | 10500 |
| Candidate 2 | 8390 |
| ... | ... |
| Candidate M | 9345 |

Figure 5:
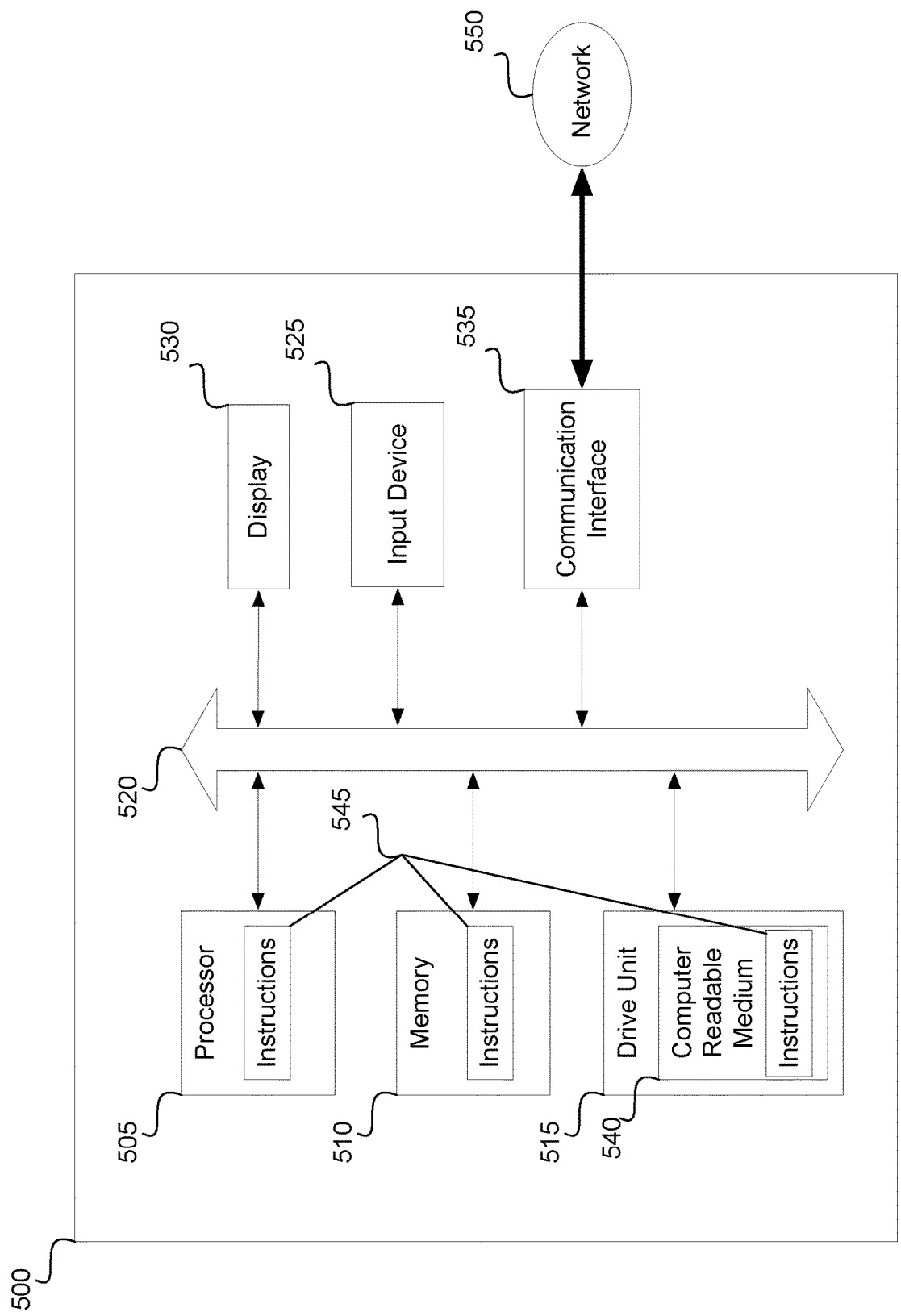
FIG. 5 illustrates a computer system that may correspond to one or more systems.

FIG. 5 illustrates a computer system 500 that may form part of or implement the systems described above. The computer system 500 may include a set of instructions 545 that the processor 505 may execute to cause the computer system 500 to perform any of the operations described above. The computer system 500 may operate as a stand-alone device or may be connected, e.g., using a network, to other computer systems or peripheral devices.

In a networked deployment, the computer system 500 may operate in the capacity of a server or as a client-user computer in a server-client user network environment, or as a peer computer system in a peer-to-peer (or distributed) network environment. The computer system 500 may also be implemented as or incorporated into various devices, such as a personal computer or a mobile device, capable of executing the instructions 545 (sequential or otherwise) that specify actions to be taken by that machine. Further, each of the systems described may include any collection of subsystems that individually or jointly execute a set, or multiple sets, of instructions to perform one or more computer functions.

The computer system 500 may include one or more memory devices 510 on a bus 520 for communicating information. In addition, code operable to cause the computer system to perform any of the operations described above may be stored in the memory 510. The memory 510 may be a random-access memory, read-only memory, programmable memory, hard disk drive or any other type of memory or storage device.

The computer system 500 may include a display 530, such as a liquid crystal display (LCD), a cathode ray tube (CRT), or any other display suitable for conveying information. The display 530 may act as an interface for the user to see the functioning of the processor 505, or specifically as an interface with the software stored in the memory 510 or in the drive unit 515.

Additionally, the computer system 500 may include an input device 525, such as a keyboard or mouse, configured to allow a user to interact with any of the components of system 500.

The computer system 500 may also include a disk or optical drive unit 515. The disk drive unit 515 may include a computer-readable medium 540 in which the instructions 545 may be stored. The instructions 545 may reside completely, or at least partially, within the memory 510 and/or within the processor 505 during execution by the computer system 500. The memory 510 and the processor 505 also may include computer-readable media as discussed above.

The computer system 500 may include a communication interface 535 to support communications via a network 550. The network 550 may include wired networks, wireless networks, or combinations thereof. The communication interface 535 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for anonymously communicating data that defines a token from a source system to a destination system via a block-chain distributed database, the method comprising:

receiving, at a token distribution system, request information from a source system, wherein the request information specifies source identifying information and an address for receiving one or more tokens;

determining, by the token distribution system, whether a user associated with the request is registered with the token distribution system and, if so, a number of tokens to allocate to the user;

if the user is determined to be registered with the token distribution system, determining, by the token distribution system, one or more tokens for allocation to the source system based in part on the number of tokens to allocate to the user;

communicating, by the token distribution system via the block-chain distributed database, the allocated one or more tokens to the address defined in the request information via a zero-knowledge transaction;

moving, by the source system, the one or more tokens to a different address, the different address corresponding to an address for communicating a block-chain transaction;

communicating, by the source system, the tokens at the different address to a destination address associated with the destination system via a block-chain transaction;

communicating, by the destination system, received tokens to a token aggregation system via a block-chain transaction, wherein the token aggregation system receives tokens from a plurality of different destination systems; and generating a report that indicates a number of tokens received by each destination system, wherein prior to communicating received tokens to the token aggregation system, the method further comprises:

communicating, by the destination system, one or more transactions to the token aggregation system, each of the one or more transactions being associated with the one or more received tokens;

determining, by the token aggregation system, whether the one or more transactions are valid transactions; and communicating, by the token aggregation system to the destination system, information that defines one or more valid transactions, wherein the tokens communicated to the token aggregation system correspond to tokens associated with valid transactions.

2. The method according to claim 1, wherein the determining whether the one or more transactions are valid transactions further comprises:

comparing a timestamp within each of the one or more transactions with a predetermined time, wherein timestamps indicative of a time prior to the predetermined time are determined to be valid and timestamps indicative of a time after to the predetermined time are determined to be invalid.

3. A method for anonymously communicating data that defines a token from a source system to a destination system via a block-chain distributed database, the method comprising:

receiving, at a token distribution system, request information from a source system, wherein the request information specifies source identifying information and an address for receiving one or more tokens;

determining, by the token distribution system, whether a user associated with the request is registered with the token distribution system and, if so, a number of tokens to allocate to the user;

if the user is determined to be registered with the token distribution system, determining, by the token distribution system, one or more tokens for allocation to the source system based in part on the number of tokens to allocate to the user;

communicating, by the token distribution system via the block-chain distributed database, the allocated one or more tokens to the address defined in the request information via a zero-knowledge transaction;

moving, by the source system, the one or more tokens to a different address, the different address corresponding to an address for communicating a block-chain transaction; and communicating, by the source system, the tokens at the different address to a destination address associated with the destination system via a block-chain transaction, wherein the request information further defines a required number of votes and the source identifying information defined in the request information defines a name of a voter, and a signature that corresponds to a concatenation of the voter name, number of votes requested, and the address for receiving the one or more tokens.

4. The method according to claim 2, further comprising:
communicating, by the token distribution system and to the source system, transaction information associated with the zero-knowledge transaction utilized for communicating the allocated one or more tokens and the signature defined in the request information;

verifying, by the source system, that the signature communicated by the token distribution system corresponds to the signature in the request.

5. The method according to claim 4, wherein verification that the signature communicated by the token distribution system corresponds to the signature in the request by the source system occurs prior to moving the one or more tokens to a different address, and wherein if verification fails, the one or more tokens are not moved to the different address.

6. The method according to claim 3, wherein the token distribution system includes a source system database that includes one or more records that relate different source systems with a number of tokens each different source system is eligible to receive, wherein the method further comprises searching, by the token distribution system, the source system database to determine whether the source system is eligible to receive the one or more tokens.

7. A system for anonymously communicating data that defines a token via a block-chain distributed database, the system comprising:
a processor;
a memory for storing instructions executable by the processor;
a token distribution system, in communication with the processor, configured to:
receive request information from a source system, wherein the request information specifies source identifying information and an address for receiving one or more tokens;
determine whether a user associated with the request is registered with the token distribution system and, if so, a number of tokens to allocate to the user;
if the user is determined to be registered with the token distribution system, determine one or more tokens for allocation to the source system based in part on the number of tokens to allocate to the user;
communicate via the block-chain distributed database the allocated one or more tokens to the address defined in the request information via a zero-knowledge transaction;

a source system, in communication with the processor, configured to:
move the one or more tokens to a different address, the different address corresponding to an address for communicating a block-chain transaction; and
communicate the tokens at the different address to a destination address associated with the destination system via a block-chain transaction;

a destination system, in communication with the processor, configured to:
communicate received tokens to a token aggregation system via a block-chain transaction; and a token aggregation system, in communication with the processor, configured to:
receive tokens from a plurality of different destination systems; and
generate a report that indicates a number of tokens received by each destination system;

wherein prior to communicating received tokens to the token aggregation system:
the destination system is configured to communicate one or more transactions each being associated with the one or more received tokens to the token aggregation system; and
the token aggregation system is configured to determine whether the one or more transactions are valid transactions, and communicate to the destination system information that defines one or more valid transactions, wherein the tokens communicated to the token aggregation system correspond to tokens associated with valid transactions.

8. The system according to claim 7, wherein determining whether the one or more transaction are valid transactions further comprises:
comparing a timestamp within each of the one or more transactions with a predetermined time, wherein timestamps indicative of a time prior to the predetermined time are determined to be valid, and timestamps indicative of a time after to the predetermined time are determined to be invalid.

9. A system for anonymously communicating data that defines a token via a block-chain distributed database, the system comprising:
a processor;
a memory for storing instructions executable by the processor;
a token distribution system, in communication with the processor, configured to:
receive request information from a source system, wherein the request information specifies source identifying information and an address for receiving one or more tokens;
determine whether a user associated with the request is registered with the token distribution system and, if so, a number of tokens to allocate to the user;
if the user is determined to be registered with the token distribution system, determine one or more tokens for allocation to the source system based in part on the number of tokens to allocate to the user;
communicate via the block-chain distributed database the allocated one or more tokens to the address defined in the request information via a zero-knowledge transaction; and
a source system, in communication with the processor, configured to:

move the one or more tokens to a different address, the different address corresponding to an address for communicating a block-chain transaction; and communicate the tokens at the different address to a destination address associated with the destination system via a block-chain transaction:

wherein the request information further defines a required number of votes and the source identifying information defined in the request information defines a name of a voter, and a signature that corresponds to a concatenation of the voter name, number of votes requested, and the address for receiving the one or more tokens.

10. The system according to claim 9, wherein:

the token distribution system is configured to communicate, to the source system, transaction information associated with the zero-knowledge transaction utilized for communicating the allocated one or more tokens and the signature defined in the request information; and the source system is configured to verify that the signature communicated by the token distribution system corresponds to the signature in the request.

11. The system according to claim 10, wherein verification that the signature communicated by the token distribution system corresponds to the signature in the request by the source system occurs prior to moving the one or more tokens to a different address, and wherein if verification fails, the one or more tokens are not moved to the different address.

12. The system according to claim 9, wherein the token distribution system includes a source system database that includes one or more records that relate different source systems with a number of tokens each different source system is eligible to receive, wherein the token distribution system is configured to search the source system database to determine whether the source system is eligible to receive the one or more tokens.

13. A non-transitory computer readable medium having instruction code stored thereon for anonymously communicating data that defines a token from a source system to a destination system via a block-chain distributed database, the instruction code being executable by a machine for causing the machine to perform acts comprising:

receiving request information from a source system, wherein the request information specifies source identifying information and an address for receiving one or more tokens;

determining whether a user associated with the request is registered with a token distribution system and, if so, a number of tokens to allocate to the user;

if the user is determined to be registered with the token distribution system, determining one or more tokens for allocation to the source system based in part on the number of tokens to allocate to the user;

communicating via the block-chain distributed database the allocated one or more tokens to the address defined in the request information via a zero-knowledge transaction;

moving the one or more tokens to a different address, the different address corresponding to an address for communicating a block-chain transaction; and communicating the tokens at the different address to a destination address associated with the destination system via a block-chain transaction;

communicating received tokens to a token aggregation system via a block-chain transaction, wherein the token aggregation system receives tokens from a plurality of different destination systems; and generating a report that indicates a number of tokens received by each destination system;

wherein prior to communicating received tokens to the token aggregation system, the instruction code is further executable to cause the machine to perform acts of:

communicating one or more transactions each being associated with the one or more received tokens to the token aggregation system;

determining whether the one or more transactions are valid transactions; and communicating, to the destination system, information that defines one or more valid transactions, wherein the tokens communicated to the token aggregation system correspond to tokens associated with valid transactions.

14. The non-transitory computer readable medium according to claim 13, wherein determining whether the one or more transaction are valid transactions further comprises:

comparing a timestamp within each of the one or more transactions with a predetermined time, wherein timestamps indicative of a time prior to the predetermined time are determined to be valid, and timestamps indicative of a time after to the predetermined time are determined to be invalid.

15. A non-transitory computer readable medium having instruction code stored thereon for anonymously communicating data that defines a token from a source system to a destination system via a block-chain distributed database, the instruction code being executable by a machine for causing the machine to perform acts comprising:

receiving request information from a source system, wherein the request information specifies source identifying information and an address for receiving one or more tokens;

determining whether a user associated with the request is registered with a token distribution system and, if so, a number of tokens to allocate to the user;

if the user is determined to be registered with the token distribution system, determining one or more tokens for allocation to the source system based in part on the number of tokens to allocate to the user;

communicating via the block-chain distributed database the allocated one or more tokens to the address defined in the request information via a zero-knowledge transaction;

moving the one or more tokens to a different address, the different address corresponding to an address for communicating a block-chain transaction; and communicating the tokens at the different address to a destination address associated with the destination system via a block-chain transaction, wherein the request information further defines a required number of votes and the source identifying information defined in the request information defines a name of a voter, and a signature that corresponds to a concatenation of the voter name, number of votes requested, and the address for receiving the one or more tokens.

16. The non-transitory computer readable medium according to claim 15, wherein the instruction code is further executable to cause the machine to perform acts of:

communicating, to the source system, transaction information associated with the zero-knowledge transaction utilized for communicating the allocated one or more tokens and the signature defined in the request information; and verifying that the signature communicated by the token distribution system corresponds to the signature in the request.

17. The non-transitory computer readable medium according to claim 16, wherein verification that the signature communicated by the token distribution system corresponds to the signature in the request by the source system occurs prior to moving the one or more tokens to a different address, and wherein if verification fails, the one or more tokens are not moved to the different address.

18. The non-transitory computer readable medium according to claim 15, wherein the token distribution system includes a source system database that includes one or more records that relate different source systems with a number of tokens each different source system is eligible to receive, wherein the method further comprises searching, by the token distribution system, the source system database to determine whether the source system is eligible to receive the one or more tokens.

\* \* \* \* \*